(12) United States Patent
Hino (10) Patent No.: US 12,448,024 B2
(45) Date of Patent: Oct. 21, 2025

(54) DECORATIVE BODY (71) Applicant: KABUSHIKI KAISHA TOKAI-RIKA-DENKI-SEISAKUSHO, Aichi (JP)

(72) Inventor: Taichi Hino, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 18/291,729

(22) PCT Filed: Jul. 5, 2022

(86) PCT No.: PCT/JP2022/026750
§ 371 (c)(1),
(2) Date: Jan. 24, 2024

(87) PCT Pub. No.: WO2023/008115
PCT Pub. Date: Feb. 2, 2023

(65) Prior Publication Data
US 2024/0253688 A1 Aug. 1, 2024

(30) Foreign Application Priority Data
Jul. 28, 2021 (JP) .................. 2021-123641

(51) Int. Cl.
B62D 1/06 (2006.01)
(52) U.S. Cl.
CPC ..................... B62D 1/06 (2013.01)
(58) Field of Classification Search
None
See application file for complete search history.

(56) References Cited

U.S. PATENT DOCUMENTS

2018/0348392 A1 12/2018 Nishio et al.
2018/0354543 A1 12/2018 Nishio et al.
2023/0119523 A1 4/2023 Hino

FOREIGN PATENT DOCUMENTS

| CN | 109533002 A | * | 3/2019 | ............ B60R 11/02 |
|---|---|---|---|---|
| JP | 2006256502 A | | 9/2006 | |
| JP | 2018008640 | | 1/2018 | |
| JP | 2018203061 | | 12/2018 | |
| JP | 2019000992 | | 1/2019 | |
| JP | 2019167014 | | 10/2019 | |
| JP | 2020157956 | | 10/2020 | |

(Continued)

OTHER PUBLICATIONS

PCT International Search Report (with English Translation) for corresponding PCT Application No. PCT/JP2022/026750, mailed Aug. 30, 2022, 5 pages.

(Continued)

Primary Examiner — Vicky A Johnson
(74) Attorney, Agent, or Firm — Dority & Manning, P.A.

(57) ABSTRACT

Garnishes of a steering wheel are disposed from an upper side to a lower side of a rim section with respect to spoke sections at a vehicle left side and a vehicle right side. Thus, the garnishes are disposed at connection regions of the rim section with the spoke sections. Therefore, ranges of sensing by the garnishes of hands of a vehicle occupant touching the garnishes are broadened as far as the connection regions of the rim section with the spoke sections.

12 Claims, 7 Drawing Sheets (56) References Cited

FOREIGN PATENT DOCUMENTS

| | | |
|---|---|---|
| JP | 2021042491 A | 3/2021 |
| JP | 2021109605 | 8/2021 |
| WO | WO-2019181485 A1 * | 9/2019 ............... B62D 1/06 |

OTHER PUBLICATIONS

Written Opinion of the International Searching Authority for corresponding PCT Application No. PCT/JP2022/026750, dated Aug. 30, 2022, 5 pages.
Japanese Office Action (w/machine translation) for corresponding Application No. 2021-123641, mailed Sep. 9, 2025, 5 pages.

* cited by examiner

DECORATIVE BODY

CROSS-REFERENCE TO RELATED APPLICATIONS

The present application is related and has right of priority to JP 2021-123641, which was filed on Jan. 28, 2021 in the Japanese Patent Office, and is a U.S. national phase entry of PCT/JP2022/026750, which was filed on Jul. 5, 2022, both of which are incorporated by reference in their entireties for all purposes.

TECHNICAL FIELD

The present invention relates to a decorative body in which a decorative portion of a decorative member decorates a steering apparatus.

BACKGROUND ART

In a steering wheel recited in Japanese Patent Application Laid-Open (JP-A) No. 2018-203061, a rim and spokes are connected, and a furnishing component is provided at the rim. A conductive member is disposed at the furnishing component, and the furnishing component (conductive member) senses a vehicle occupant touching against the furnishing component.

In this steering wheel, the furnishing component is provided at the rim excluding connection regions of the rim with the spokes.

SUMMARY OF INVENTION

Technical Problem

In consideration of the circumstances described above, an object of the present invention is to provide a decorative body that may broaden a range of sensing by a decorative member that senses touches by a vehicle occupant.

Solution to Problem

A decorative body according to a first aspect of the present invention includes a decorative member provided at a steering apparatus and a decorative portion that is provided at the decorative member and decorates the steering apparatus. The steering apparatus is supported at a support portion, and a grip portion and a connecting portion are provided at the steering apparatus. A vehicle occupant grips the grip portion, and the connecting portion is connected with the grip portion. The decorative member is disposed at a side of the grip portion at which the support portion is disposed, the decorative member is disposed from one length direction side to another length direction side of the grip portion relative to the connecting portion, and the decorative member senses a touch of the vehicle occupant.

In a decorative body according to a second aspect of the present invention, in the decorative body according to the first aspect of the present invention, the decorative member is disposed at a connection region of the connecting portion with the grip portion.

In a decorative body according to a third aspect of the present invention, the decorative body according to the first aspect or second aspect of the present invention further includes a deforming portion provided at the decorative member, a thickness dimension of the decorative member being reduced at the deforming portion for facilitating torsional deformation of the decorative body.

In a decorative body according to a fourth aspect of the present invention, the decorative body according to any one of the first to third aspects of the present invention further includes a deforming portion provided at the decorative member, a width dimension of the decorative member being reduced at the deforming portion for facilitating torsional deformation of the decorative body.

In a decorative body according to a fifth aspect of the present invention, in the decorative body according to the third aspect or fourth aspect of the present invention, the deforming portion is disposed at a reduced strength portion of the grip portion.

In a decorative body according to a sixth aspect of the present invention, the decorative body according to any one of the first to fifth aspects of the present invention further includes: a strong fixing portion provided at the decorative member, the strong fixing portion being fixed to the grip portion and a fixing strength of the strong fixing portion to the grip portion being strengthened: and a weak fixing portion provided at the decorative member, the weak fixing portion being fixed to the grip portion and a fixing strength of the weak fixing portion to the grip portion being weakened.

Advantageous Effects of Invention

In the decorative body according to the first aspect of the present invention, the decorative member is provided at the steering apparatus and the steering apparatus is supported at the support portion. Moreover, the grip portion that a vehicle occupant grips and the connecting portion that is connected to the grip portion are provided. The decorative member is disposed at the side of the grip portion at which the support portion is disposed, and the decorative portion of the decorative member decorates the steering apparatus. In addition, the decorative member senses a vehicle occupant touching against the decorative member.

The decorative member is disposed from the one side to the another side in the length direction of the grip portion about the connecting portion. Therefore, because the decorative member can be disposed in the connection region of the grip portion with the connecting portion, a range of sensing by the decorative member of touches by the vehicle occupant may be broadened.

In the decorative body according to the second aspect of the present invention, the decorative member is disposed at the connection region of the grip portion with the connecting portion. Therefore, the range of sensing by the decorative member of touches by the vehicle occupant may be broadened.

In the decorative body according to the third aspect of the present invention, the deforming portion is provided at the decorative member, the thickness dimension of the decorative member is reduced at the deforming portion, and torsional deformation of the decorative member is facilitated at the deforming portion. Therefore, breakage of the decorative member may be inhibited by the decorative member torsionally deforming at the deforming portion.

In the decorative body according to the fourth aspect of the present invention, the deforming portion is provided at the decorative member, the width dimension of the decorative member is reduced at the deforming portion, and torsional deformation of the decorative member is facilitated at the deforming portion. Therefore, breakage of the decorative member may be inhibited by the decorative member torsionally deforming at the deforming portion.

In the decorative body according to the fifth aspect of the present invention, the deforming portion is disposed at the reduced strength portion of the grip portion. Therefore, when the grip portion is torsionally deformed at the reduced strength portion, the deforming portion may torsionally deform along with the torsional deformation of the reduced strength portion, and breakage of the decorative member may be inhibited effectively.

In the decorative body according to the sixth aspect of the present invention, the strong fixing portion and weak fixing portion of the decorative member are fixed to the grip portion, with the fixing strength of the strong fixing portion to the grip portion being stronger and the fixing strength of the weak fixing portion to the grip portion being weaker. Hence, when the grip portion is torsionally deformed between the strong fixing portion and the weak fixing portion, the fixing of the weak fixing portion to the grip portion is released. Therefore, torsional deformation of the decorative member may be inhibited and breakage of the decorative member may be inhibited.

DETAILED DESCRIPTION

First Exemplary Embodiment

Figure 1:
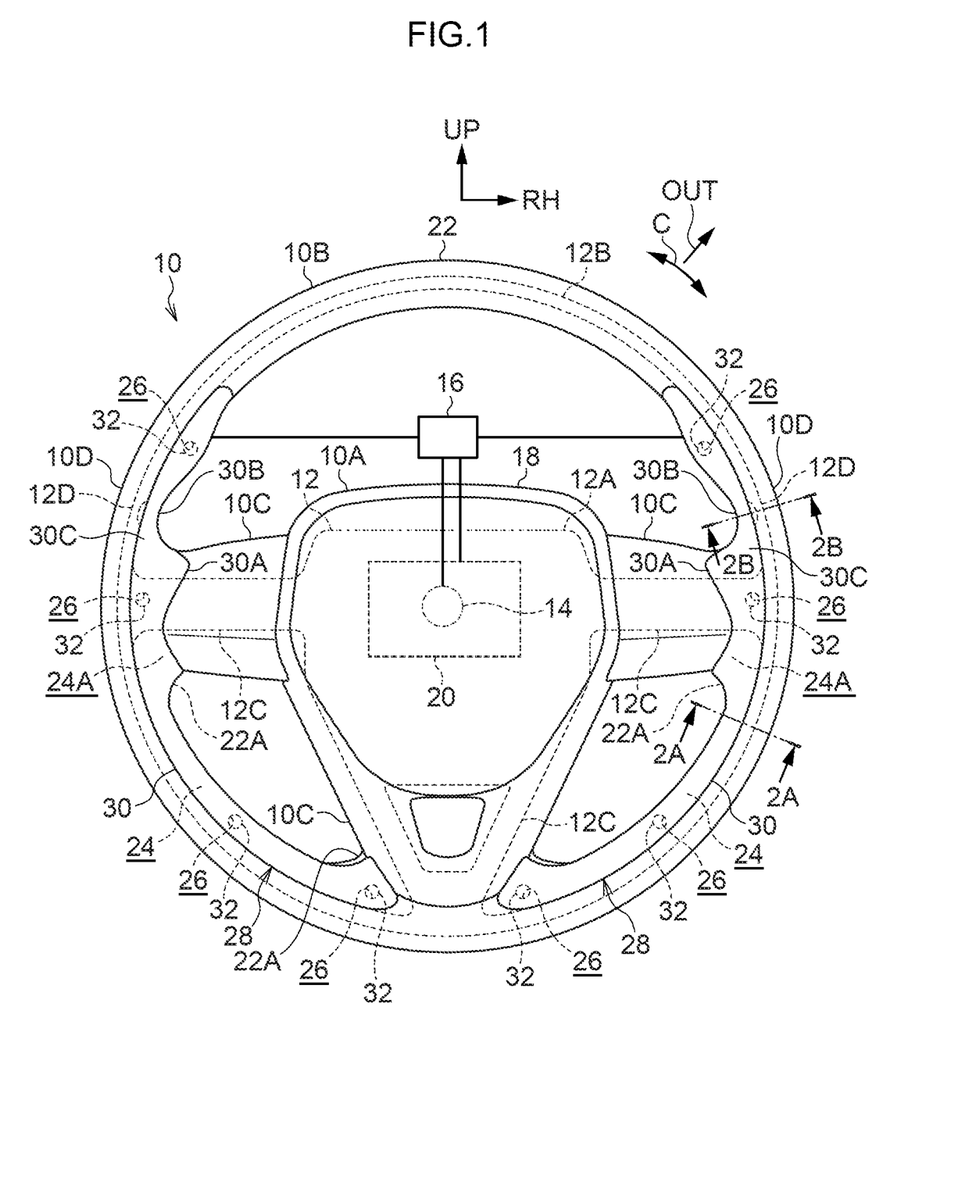
FIG. 1 is an elevation view, seen from a vehicle rear side, showing a steering wheel according to a first exemplary embodiment of the present invention.

FIG. 1 is an elevation view, seen from a vehicle rear side, showing a steering wheel 10 that serves as a steering apparatus according to a first exemplary embodiment of the present invention. In the drawings, a vehicle front side is indicated by arrow FR, a vehicle right side is indicated by arrow RH, and an upper side is indicated by arrow UP. The circumferential direction of the steering wheel 10 is indicated by arrow C and the radial direction outer side of the steering wheel 10 is indicated by arrow OUT.

The steering wheel 10 according to the present exemplary embodiment opposes a driver seat of the vehicle, which is at the vehicle rear side of the steering wheel 10. The steering wheel 10 is disposed to the vehicle front side of a vehicle occupant sitting on the driver seat (a driver, who touches the steering wheel 10).

As shown in FIG. 1, a boss portion 10A that serves as a supported portion is provided at a central region of the steering wheel 10. A rim section 10B with an annular shape in elevation view, which serves as a grip portion, is provided at an outer periphery region of the steering wheel 10. Three spoke sections 10C that serve as connecting portions are provided between the boss portion 10A and the rim section 10B. The spoke sections 10C protrude to the vehicle left side, vehicle right side and lower side from the boss portion 10A, and connect the boss portion 10A with the rim section 10B.

A core 12 fabricated of metal that serves as a framework member is provided at the steering wheel 10.

A boss core 12A in a plate shape is provided at a central region of the core 12. The boss core 12A structures the boss portion 10A. The boss core 12A is fixed to a vehicle rear side end (upper side end) of a circular rod-shaped steering shaft 14 of the vehicle, which serves as a support portion. The steering shaft 14 is disposed to be concentric with the rim section 10B. The steering wheel 10 (the core 12) is supported at the steering shaft 14 to be turnable integrally therewith. When the vehicle occupant holds the rim section 10B and operates to turn the steering wheel 10 in the circumferential direction thereof, the steering shaft 14 turns about the central axis thereof and the vehicle is steered. The steering shaft 14 is electronically connected to a control device 16 of the vehicle.

A rim core 12B with an annular shape in elevation view (see FIG. 2A) is provided at an outer periphery region of the core 12. The rim core 12B structures the rim section 10B. Three spoke cores 12C in plate shapes are provided between the boss core 12A and the rim core 12B. The spoke cores 12C protrude from the boss core 12A to the vehicle left side, vehicle right side and lower side (to outer sides in the radial direction of the steering wheel 10). The spoke cores 12C connect the boss core 12A with the rim core 12B, and structure the spoke sections 10C.

A substantially box-shaped pad 18 fabricated of resin, which serves as an accommodation member, is provided at the boss portion 10A and the spoke sections 10C. The interior of the pad 18 is open to the vehicle front side. The pad 18 is attached to the vehicle rear side of the boss core 12A and the spoke cores 12C. The pad 18 covers the vehicle rear side of the boss core 12A and regions of the spoke cores 12C extending to vicinities of the rim section 10B.

An airbag apparatus 20 is accommodated in the pad 18. A bag-shaped airbag (not shown in the drawings) is provided in the airbag apparatus 20 in a folded state. The airbag apparatus 20 is electronically connected to the control device 16.

A pair of reduction portions 12D (see FIG. 2B) are provided at the rim core 12B. The reduction portions 12D are disposed at an upper side vicinity of a connection region between the rim core 12B and the spoke core 12C at the vehicle left side and an upper side vicinity of a connection region between the rim core 12B and the spoke core 12C at the vehicle right side. At the reduction portions 12D, cross-sectional area of the rim core 12B is reduced relative to regions of the rim core 12B other than the reduction portions 12D. Thus, strength of the rim core 12B is lowered at the reduction portions 12D relative to regions of the rim core 12B other than the reduction portions 12D. Regions of the rim section 10B at the locations of the reduction portions 12D serve as strength reduction portions 10D. Strength of the rim section 10B is lowered at the strength reduction portions 10D relative to regions of the rim section 10B other than the strength reduction portions 10D.

A covered member 22 (see FIG. 2A and FIG. 2B) with an annular shape in elevation view, which serves as a fixed member, is provided at the whole of the rim section 10B in a length direction of the rim section 10B (the circumferential direction of the steering wheel 10) and a perimeter direction of the rim section 10B (a direction encircling the length direction). The covered member 22 is fabricated of a soft resin (for example, polyurethane). An exterior shape of the covered member 22 in a cross section orthogonal to the length direction is a substantially circular shape. The rim core 12B is accommodated inside the covered member 22, and the covered member 22 is fixed to the rim core 12B.

Figure 2A:
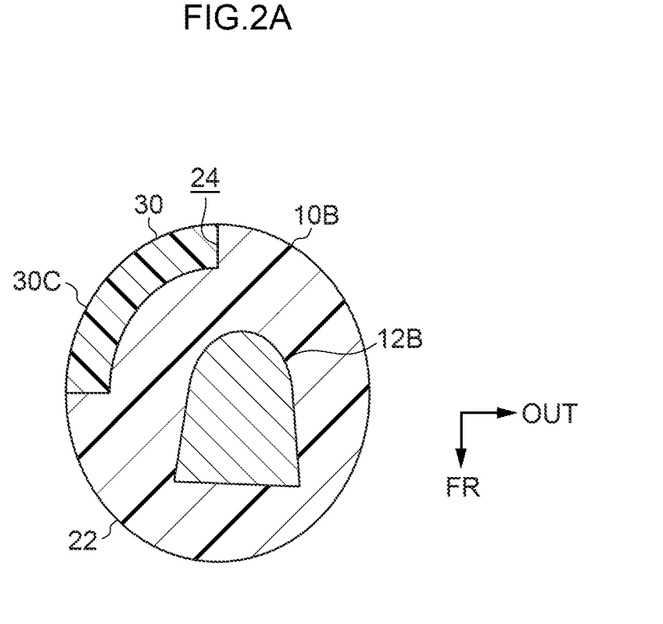
FIG. 2A is a sectional diagram (a sectional diagram cut along line 2A-2A in FIG. 1) showing a rim section of the steering wheel according to the first exemplary embodiment of the present invention.
Figure 2B:
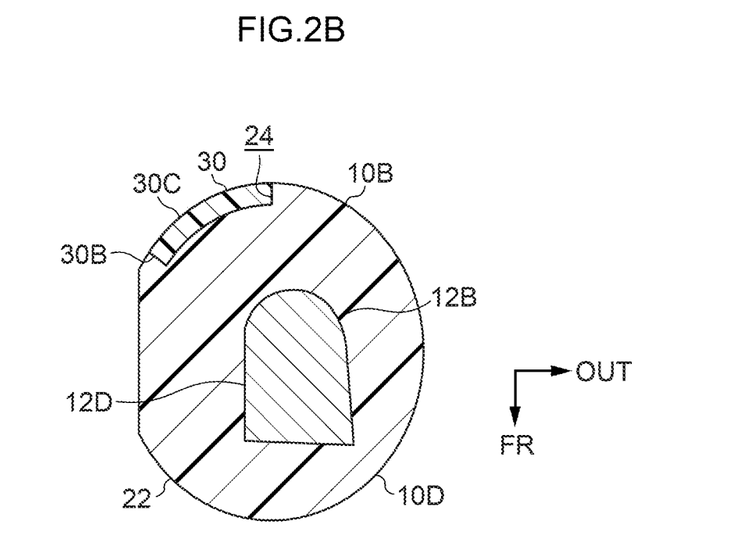
FIG. 2B is a sectional diagram (a sectional diagram cut along line 2B-2B in FIG. 1) showing the rim section of the steering wheel according to the first exemplary embodiment of the present invention.

Protruding rods 22A in substantially rectangular rod shapes are integrally formed at a vehicle right side end portion, a vehicle left side end portion and a lower end portion of the covered member 22. Each protruding rod 22A projects to the radial direction inner side of the steering wheel 10. Regions of the spoke cores 12C in vicinities of the rim core 12B are accommodated in the protruding rods 22A. The protruding rods 22A are fixed to the spoke cores 12C and structure regions of the spoke sections 10C in vicinities of the rim section 10B.

Fixing recess portions 24 (see FIG. 2A and FIG. 2B) are formed at the vehicle left side and vehicle right side of the covered member 22, excluding an upper portion and a lower end portion of the covered member 22. Each fixing recess portion 24 is disposed at the covered member 22 at the vehicle rear side and the steering wheel 10 radial direction inner side of the covered member 22. The fixing recess portion 24 extends in the length direction of the rim section 10B. A length direction of the fixing recess portion 24 runs along the length direction of the rim section 10B and a width direction of the fixing recess portion 24 runs along the perimeter direction of the rim section 10B. Protrusion recess portions 24A are formed at the vehicle rear side of the protruding rods 22A at the vehicle left side and vehicle right side of the covered member 22. The protrusion recess portions 24A are in communication with the fixing recess portions 24.

A plural number (four in the present exemplary embodiment) of fixing holes 26 in substantially cylindrical shapes (see FIG. 4A) are formed in a floor portion of each fixing recess portion 24. The fixing holes 26 open to the vehicle rear side. The plural fixing holes 26 are arranged substantially equidistantly in the length direction of the fixing recess portion 24. The strength reduction portion 10D of the rim section 10B is disposed between the two fixing holes 26 at the upper side. A distal end side portion (a floor side portion) of each fixing hole 26 increases in diameter coaxially. A surface at a proximal end side (opening side) of the distal end side portion of the fixing hole 26 is formed as an engaging surface 26A with an annular shape.

Decorative bodies 28 are disposed at the fixing recess portions 24 of the covered member 22 and the protrusion recess portions 24A of the protruding rods 22A.

A garnish 30 in a long, narrow plate shape (see FIG. 2A) that serves as a decorative member is provided at each decorative body 28. The garnish 30 is curved in a length direction and a width direction thereof. The length direction of the garnish 30 is arranged along the length direction of the fixing recess portion 24, and the width direction of the garnish 30 is arranged along the width direction of the fixing recess portion 24. The garnish 30 tightly fits in the fixing recess portion 24, and a facing side surface of the garnish 30 is coplanar with a periphery surface of the covered member 22. Thus, the garnish 30 structures the rim section 10B. The garnish 30 is disposed at the steering wheel 10 radial direction inner side of the rim section 10B (the side of the rim section 10B at which the steering shaft 14 is disposed) and the vehicle rear side of the rim section 10B.

Projection portions 30A in plate shapes are integrally formed at upper portion vicinities of the garnishes 30. The projection portions 30A project to the radial direction inner side of the steering wheel 10. Each projection portion 30A tightly fits in the protrusion recess portion 24A of the protruding rods 22A, and a facing side surface of the projection portion 30A is coplanar with a periphery surface of the protruding rods 22A. The projection portions 30A structure regions of the spoke sections 10C in vicinities of the rim section 10B.

Deforming portions 30B (see FIG. 2B) are formed at the garnishes 30 in upper side vicinities of the projection portions 30A. Each deforming portion 30B is disposed at the corresponding strength reduction portion 10D of the rim section 10B. A back side face and the steering wheel 10 radial direction inner side face of the deforming portion 30B are curved in a recess shape along the length direction of the garnish 30. A thickness dimension of the deforming portion 30B and width dimension of the deforming portion 30B (the width dimension of the garnish 30 and width dimension of the curved region) steadily decrease in the length direction of the garnish 30 toward the center of the deforming portion 30B. Therefore, the thickness dimension and width dimension of the deforming portion 30B are reduced relative to respective thickness dimensions and width dimensions of regions of the garnish 30 other than the deforming portions 30B, and a section modulus of the deforming portion 30B is reduced relative to section moduli of regions of the garnish 30 other than the deforming portions 30B.

A plural number (four in the present exemplary embodiment) of substantially cylindrical fixing rods 32 (see FIG. 4A) are integrally formed at the back face side of the garnish 30 to serve as fixing portions (strong fixing portions). The fixing rods 32 are formed at the vehicle front side of the garnish 30. The plural fixing rods 32 are arranged substantially equidistantly in the length direction of the garnish 30. The deforming portion 30B of the garnish 30 is disposed between the two fixing rods 32 at the upper side. A distal end side portion of each fixing rod 32 is formed coaxially in a truncated cone shape. A face at the proximal end side of the distal end side portion of the fixing rod 32 is wider in diameter than a proximal end side portion of the fixing rod 32, being formed as an engaged surface 32A with an annular shape. The fixing rods 32 are inserted into the fixing holes 26, with the distal end side portion of each fixing rod 32 resiliently expanding the diameter of the proximal end side portion of the corresponding fixing hole 26 of the rim section 10B. The engaged surface 32A is engaged with the engaging surface 26A of the fixing hole 26. Thus, the garnish 30 (including the projection portion 30A) is fixed to the rim section 10B. The engaged surfaces 32A are engaged with all of the engaging surfaces 26A, strengthening a fixing strength of the fixing rods 32 to the rim section 10B.

The facing side surface of the garnish 30 (including the projection portion 30A) is structured with a decorative layer 30C that serves as a decorative portion. The decorative layer 30C is formed with, for example, a wood grain pattern and decorates the steering wheel 10.

An electrode layer that serves as a sensing portion (not shown in the drawings) is formed at the garnish 30 (including the projection portion 30A, at the back side of the decorative layer 30C. The electrode layer is fabricated of metal or conductive resin and is conductive. The electrode layer senses electrostatic capacitance with a hand of a vehicle occupant touching the garnish 30 (including the projection portion 30A). Thus, the electrode layer enables detection of touches of the garnish 30 (including the projection portion 30A) by the hand of the vehicle occupant. The electrode layer is electronically connected to the control device 16.

Now, operation of the present exemplary embodiment is described.

In the steering wheel 10 with the structure described above, the control device 16 detects gripping of the rim section 10B by a vehicle occupant on the basis of a rotary torque acting on the steering shaft 14 being at least a predetermined rotary torque.

The control device 16 also detects gripping of the rim section 10B by the vehicle occupant on the basis of an electrostatic capacitance between a hand of the vehicle occupant and the electrode layer of the garnish 30 (including the projection portion 30A) being at least a predetermined electrostatic capacitance. Therefore, even when the vehicle occupant grips a region of the rim section 10B, apart from the upper portion and the lower end portion, with weak force (when a rotary torque acting on the steering shaft 14 is less than the predetermined rotary torque), the gripping of the rim section 10B by the vehicle occupant may be detected by the control device 16.

At a time of collision of the vehicle, under the control of the control device 16, high-pressure gas is instantaneously supplied into the airbag of the airbag apparatus 20 and the airbag inflates. The airbag ruptures the pad 18 and expands completely to the vehicle rear side of the steering wheel 10. Therefore, even if the head of the vehicle occupant collides with the airbag, kinetic energy of the head of the vehicle occupant is absorbed by the airbag and an impact on the head of the vehicle occupant is moderated.

When the head of the vehicle occupant collides with the airbag, the rim section 10B is torsionally deformed at the strength reduction portions 10D, and an upper side portion of the rim section 10B relative to the strength reduction portions 10D is tilted to the vehicle front side. Therefore, kinetic energy of the head of the vehicle occupant is absorbed by the torsional deformation of the rim section 10B, and the impact on the head of the vehicle occupant is moderated effectively.

The garnishes 30 are arranged from the upper side to the lower side of the rim section 10B with respect to the spoke sections 10C at the vehicle left side and vehicle right side Because the garnishes 30 are disposed at connection regions of the rim section 10B with the spoke sections 10C at the vehicle left side and vehicle right side, ranges of sensing by the garnishes 30 (the electrode layers) of touches by the hands of a vehicle occupant may be broadened to reach the connection regions of the rim section 10B with the spoke sections 10C at the vehicle left side and vehicle right side. Thus, the ranges of sensing of gripping of the rim section 10B by the vehicle occupant may be broadened. Moreover, a need to divide each garnish 30 into an upper side region and a lower side region about the spoke section 10C at the vehicle left side or vehicle right side may be eliminated, a component count may be reduced, and costs may be reduced. In addition, decoration of the steering wheel 10 by the decorative layers 30C of the garnishes 30 may be enhanced.

The projection portions 30A of the garnishes 30 are disposed at connection regions with the rim section 10B of the spoke sections 10C at the vehicle left side and vehicle right side (regions in vicinities of the rim section 10B). Therefore, the ranges of sensing by the garnishes 30 (including the projection portions 30A) of touches by the vehicle occupant may be broadened to the connection regions with the rim section 10B of the spoke sections 10C at the vehicle left side and vehicle right side, and an accuracy of detection of gripping at the connection regions with the rim section 10B of the spoke sections 10C at the vehicle left side and vehicle right side may be raised.

Each garnish 30 is disposed at the steering wheel 10 radial direction inner side of the rim section 10B. Therefore, the garnish 30 (electrode layer) at a lower portion of the rim section 10B unintendedly sensing a touch by a leg of a vehicle occupant or the like, as in a structure in which the garnish 30 is disposed at the steering wheel 10 radial direction outer side of the rim section 10B, may be suppressed. In addition, at positions of the garnish 30 in a small range (around a quarter of the whole circumference), intended gripping by the vehicle occupant may be sensed at the vehicle occupant side of the rim section 10B at the steering wheel 10 radial direction inner side of the rim section 10B.

The thickness dimension and width dimension of each garnish 30 are reduced at the deforming portion 30B, facilitating torsional deformation of the garnish 30 at the deforming portion 30B. Therefore, when the rim section 10B is torsionally deformed at a time of collision of the vehicle, breakage of the garnish 30 may be inhibited by the garnish 30 torsionally deforming at the deforming portion 30B.

The deforming portion 30B is disposed at the strength reduction portion 10D of the rim section 10B. Therefore, when the rim section 10B is torsionally deformed at the strength reduction portion 10D at a time of collision of the vehicle, the deforming portion 30B may torsionally deform along with torsional deformation of the strength reduction portion 10D, and breakage of the garnish 30 may be inhibited effectively.

In the present exemplary embodiment, the thickness dimension and width dimension of each garnish 30 is reduced at the deforming portion 30B. However, reducing at least one of the thickness dimension and width dimension of the garnish 30 at the deforming portion 30B is sufficient.

Second Exemplary Embodiment

Figure 3A:
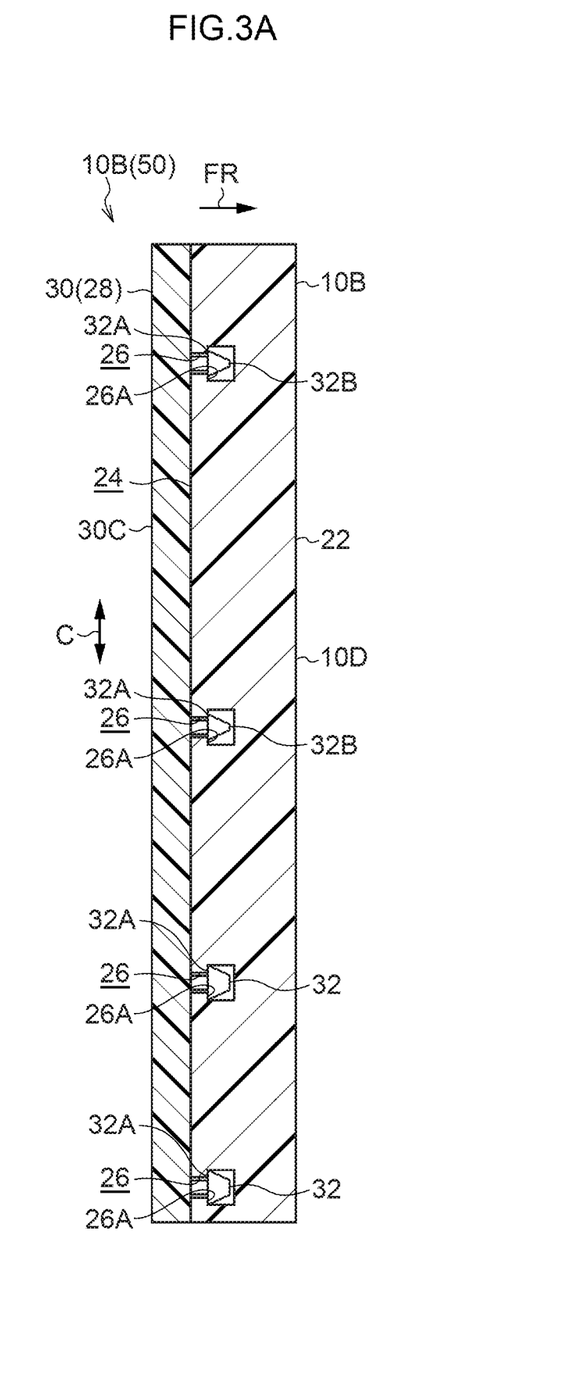
FIG. 3A is a sectional diagram, cut along a length direction, showing a rim section, before deformation, of a steering wheel according to a second exemplary embodiment of the present invention.

FIG. 3A is a sectional diagram, cut along a length direction, showing the rim section 10B of a steering wheel 50 that serves as a steering apparatus according to a second exemplary embodiment of the present invention.

The steering wheel 50 according to the present exemplary embodiment has substantially the same structure as in the first exemplary embodiment described above but differs in the following respects.

As shown in FIG. 3A, at the rim section 10B of the steering wheel 50 according to the present exemplary embodiment, the deforming portion 30B according to the first exemplary embodiment is formed at the garnish 30 of each decorative body 28.

The two fixing rods 32 at the lower side of the garnish 30 according to the first exemplary embodiment are formed as strong fixing rods 32 (see FIG. 4A) that serve as strong fixing portions, with structures the same as the fixing rods 32 according to the first exemplary embodiment that are described above.

Figure 4A:
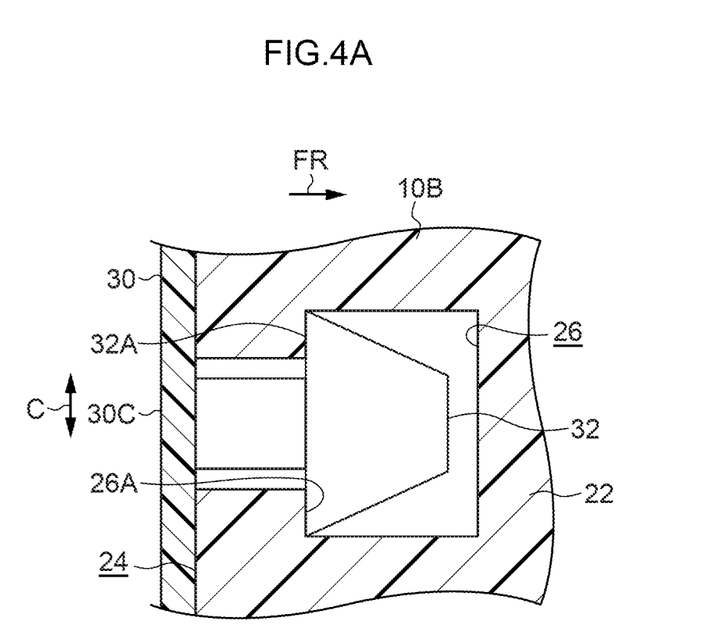
FIG. 4A is a sectional diagram showing a strong fixing portion of a garnish of the steering wheel according to the second exemplary embodiment of the present invention (equivalent to a fixing portion of a garnish of the steering wheel according to the first exemplary embodiment).
Figure 4B:
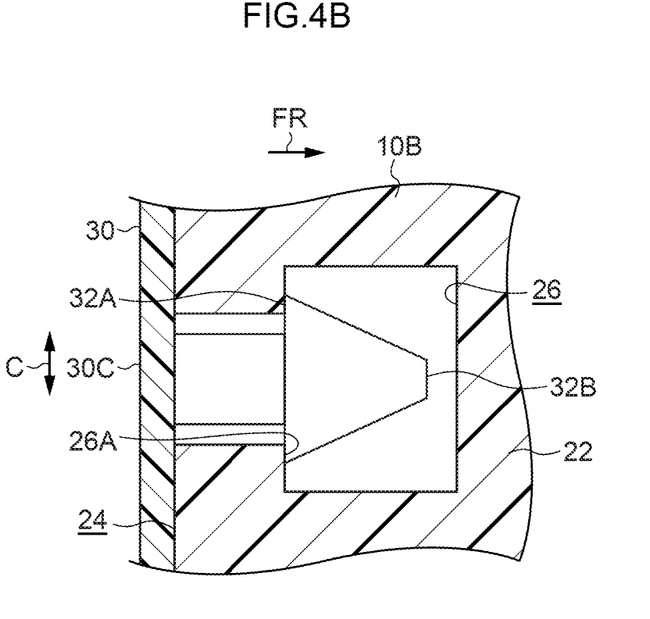
FIG. 4B is a sectional diagram showing a weak fixing portion of the garnish of the steering wheel according to the second exemplary embodiment of the present invention.

The two fixing rods 32 at the upper side of the garnish 30 according to the first exemplary embodiment are formed as weak fixing rods 32B (see FIG. 4B) that serve as weak fixing portions. Diameters of the distal end side portions of the weak fixing rods 32B are smaller than diameters of the distal end side portions of the strong fixing rods 32. Outer diameters of the engaged surfaces 32A of the weak fixing rods 32B are smaller than outer diameters of the engaged surfaces 32A of the strong fixing rods 32. An engaging area of the engaged surface 32A of each weak fixing rod 32B with the engaging surface 26A of the corresponding fixing hole 26 of the rim section 10B is smaller than an engaging area of the engaged surface 32A of each strong fixing rod 32 with the corresponding engaging surface 26A. Thus, a fixing strength of the weak fixing rod 32B to the rim section 10B is weaker than a fixing strength of the strong fixing rod 32 to the rim section 10B.

In the present exemplary embodiment too, the same operations and effects as in the first exemplary embodiment described above are realized.

In particular, each strength reduction portion 10D of the rim section 10B is disposed between the strong fixing rods 32 (the strong fixing rod 32 at the upper side) and weak fixing rods 32B (the weak fixing rod 32B at the upper side) of the garnish 30. Therefore, when the rim section 10B is torsionally deformed at the strength reduction portions 10D at a time of collision of the vehicle, the weak fixing rods 32B are detached from the fixing holes 26. Thus, torsional deformation of the garnishes 30 may be inhibited and breakage of the garnishes 30 may be inhibited (see FIG. 3B).

Figure 3B:
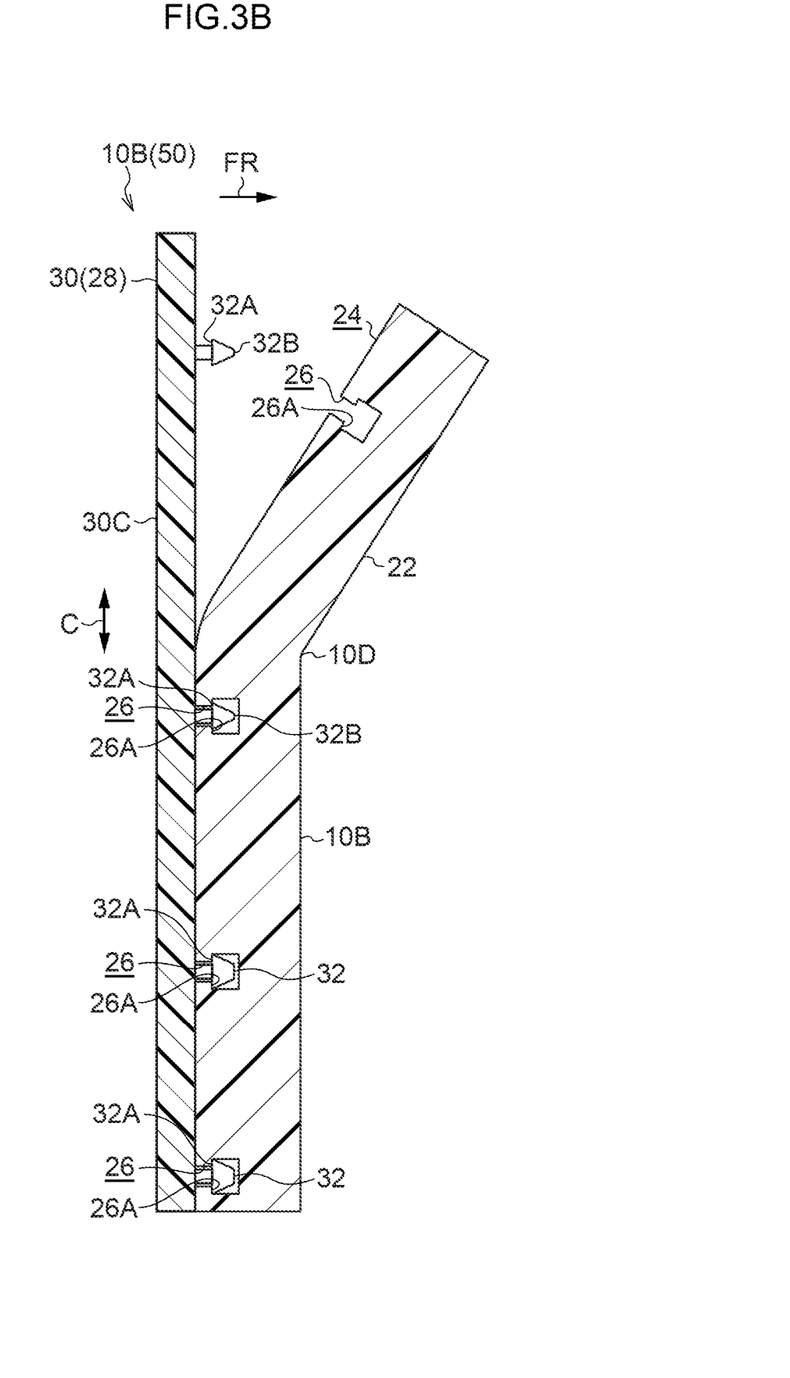
FIG. 3B is a sectional diagram, cut along the length direction, showing the rim section, after deformation, of the steering wheel according to the second exemplary embodiment of the present invention.

Because the weak fixing rods 32B are detached from the fixing holes 26 when the rim section 10B is torsionally deformed at the strength reduction portions 10D at the time of collision of the vehicle, detachment forces acting on the strong fixing rods 32 from the fixing holes 26 are reduced, and detachment of the strong fixing rods 32 from the fixing holes 26 is suppressed. Therefore, incidences of the garnishes 30 falling from the rim section 10B may be suppressed.

In the present exemplary embodiment, the deforming portion 30B according to the first exemplary embodiment may be formed at each garnish 30.

In the first exemplary embodiment and second exemplary embodiment described above, the garnishes 30 are disposed at the rim section 10B at the perimeter direction inner side of the steering wheel 10 or 50. However, the garnishes 30 may extend to the rim section 10B at the perimeter direction outer side of the steering wheel 10 or 50.

In the first exemplary embodiment and second exemplary embodiment described above, the garnishes 30 are disposed at the vehicle rear side of the rim section 10B, but the garnishes 30 may extend to the vehicle front side of the rim section 10B. Furthermore, the garnish 30 at the left side and the garnish 30 at the right side need not be separated from one another but may be integrated at the upper side, the lower side, or both the upper and lower sides. Leather may be wrapped onto the covered member 22.

The disclosures of Japanese Patent Application No. 2021-123641 filed Jul. 28, 2021 are incorporated into the present Description by reference in their entirety.

EXPLANATION OF THE REFERENCE SYMBOLS 10, steering wheel (steering apparatus); 10B, rim section (grip portion); 10C, spoke section (connecting portion); 10D, strength reduction portion; 14, steering shaft (support portion); 28, decorative body; 30, garnish (decorative member); 30B, deforming portion; 30C, decorative layer (decorative portion); 32, strong fixing rod (strong fixing portion); 32B, weak fixing rod (weak fixing portion); 50, steering wheel (steering apparatus).

The invention claimed is:

1. A decorative body, comprising:
   a decorative member provided at a steering apparatus,
      the decorative member being disposed at a side of a grip portion of the steering apparatus at which a support portion of the steering apparatus is disposed,
      the decorative member being disposed from one length direction side to another length direction side of the grip portion with respect to a connecting portion connected with the grip portion, and
      the decorative member configured to sense a touch of a vehicle occupant; and
   a decorative portion that is provided at the decorative member and decorates the steering apparatus, and that constitutes a facing side surface of the decorative member.

2. The decorative body according to claim 1, wherein the decorative member comprises:
   a projection portion that projects to a radial direction inner side of the steering apparatus and is disposed at a connection region of the connecting portion with the grip portion.

3. The decorative body according to claim 1, further comprising a deforming portion provided at the decorative member, a thickness dimension of the decorative member being reduced at the deforming portion for facilitating torsional deformation of the decorative body.

4. The decorative body according to claim 3, wherein the deforming portion is disposed at a reduced strength portion of the grip portion.

5. The decorative body according to claim 1, further comprising a deforming portion provided at the decorative member, a width dimension of the decorative member being reduced at the deforming portion for facilitating torsional deformation of the decorative body.

6. The decorative body according to claim 1, further comprising:
   a first fixing portion provided at the decorative member, the first fixing portion being fixed to the grip portion; and
   a second fixing portion provided at the decorative member, the second fixing portion being fixed to the grip portion and a fixing strength of the second fixing portion to the grip portion being-weakened weaker than a fixing strength of the first fixing portion to the grip portion.

7. The decorative body according to claim 6, wherein a reduced strength portion of the grip portion is disposed between the first fixing portion and the second fixing portion.

8. The decorative body according to claim 6, wherein at least one of a thickness dimension and a width dimension of the decorative member is reduced between the first fixing portion and the second fixing portion for facilitating torsional deformation of the decorative body.

9. The decorative body according to claim 1, wherein the decorative member extends to the opposite side of the grip portion from the side thereof at which the support portion is disposed.

10. The decorative body according to claim 1, wherein the decorative member is disposed at the side of the grip portion at which the vehicle occupant is located.

11. The decorative body according to claim 1, wherein a length direction of the decorative member is arranged along a length direction of the grip portion,
the decorative member is disposed over a partial length of the grip portion in the length direction, and
the decorative member comprises:
   a portion disposed at a connection region of the grip portion with the connecting portion;
   another portion extending from the portion disposed at the connection region of the grip portion to one side in the length direction of the decorative member; and
   a further portion extending from the portion disposed at the connection region of the grip portion to the other side in the length direction of the decorative member.

12. The decorative body according to claim 1, further comprising:
   a first fixing portion provided at the decorative member, the first fixing portion being fixed to the grip portion; and
   a second fixing portion provided at the decorative member, the second fixing portion being fixed to the grip portion,
wherein the first fixing portion comprises a first engaged surface engaged with the grip portion,
the second fixing portion comprises a second engaged surface engaged with the grip portion, and
an engaging area of the second engaged surface is smaller than an engaging area of the first engaged surface.

* * * * *